United States Patent [19]

Cheek, Jr. et al.

[11] 3,886,359

[45] May 27, 1975

[54] TIME INTERVAL COMPRESSION ADDRESS SEQUENTIALLY

[75] Inventors: Tom F. Cheek, Jr., Dallas; Thomas R. Patrick, Austin, both of Tex.

[73] Assignee: Texas Instruments Incorporated, Dallas, Tex.

[22] Filed: Jan. 4, 1974

[21] Appl. No.: 430,982

[52] U.S. Cl. ................ 250/334; 250/342; 250/347; 307/221 D

[51] Int. Cl. ................ G01t 1/16

[58] Field of Search ........... 250/334, 332, 342, 347; 307/221 D

[56] References Cited

UNITED STATES PATENTS

| | | | |
|---|---|---|---|
| 3,621,283 | 11/1971 | Teer | 307/221 D |
| 3,683,193 | 8/1972 | Weimer | 307/221 R |
| 3,806,729 | 4/1974 | Caywood | 250/342 |
| 3,808,435 | 4/1974 | Bate et al | 250/332 |

OTHER PUBLICATIONS

"Solid State Imaging" by Kovac, M. G. et al., Electronics Feb. 28, 1972.

*Primary Examiner*—Harold A. Dixon
*Attorney, Agent, or Firm*—Harold Levine; Rene E. Grossman; Alva H. Bandy

[57] ABSTRACT

An infrared scanning system in which a columnar array of infrared sensors cyclically sweeps a scene in successive frame intervals to produce repetitive sets of time-amplitude-variable signals representative of optical variations across the scene. A pair of CCD storage means alternately store successive sets of variable amplitude charge packets derived from the signals at uniform spaced sample intervals. The sets are then alternately transferred out as single data streams from one storage means in each frame interval while a succeeding set of signals is being stored in the other storage means.

19 Claims, 5 Drawing Figures

TIME INTERVAL COMPRESSION ADDRESS SEQUENTIALLY

This application is related to U.S. Pat. No. 3,808,435 issued 30 Apr. 1974 to Robert T. Bate et al., entitled "Infrared Quantum Differential Detector System", these applications being assigned to the same assignee.

This invention relates to optical imaging and more particularly to the use of optical images converted to electrical form. In a more specific aspect, the invention relates to processing images of radiant energy sources in a charged coupled device with time interval compression to achieve a highly efficient duty cycle.

Optical systems in forward looking infrared radar, such as shown in U.S. Pat. No. 3,715,479 convert an infrared signal to an electrical signal which is amplified and then is reconverted to visible signals suitable for processing by an electronic camera. A cathode ray tube provides a visible display of the infrared scene. One of the most complex problems in such systems has been in the conversion of the multichannel infrared video into a single composite video signal suitable for use with display circuitry and devices such as used in a standard commercial television display. As shown in U.S. Pat. No. 3,715,497, there is conversion of the infrared scene to a set of electrical signals which are then converted to visible light signals which are then viewed by a camera for producing a video signal for a cathode ray tube.

In U.S. Pat. No. 3,742,238, a similar sequence is involved wherein an infrared scene is projected onto a light sensitive detector array from the front of a rotating mirror. The signals from the detectors are then amplified and converted back to visible light and are then projected onto the back of the mirror where they are viewed by an operator. The use of a vidicon type of pickup and CRT display is avoided. However, both types of systems in the process employed involve conversion of the output of the detector back into variable intensity visible light for the ultimate production of a human visible display.

The present invention is directed to a method and system in which the output of an infrared detector scanned by a mirror is maintained in electrical form and processed into a video stream of variable amplitude analog signals which may then be applied directly to a display tube without conversion back to a variable intensity visible light display.

More particularly, in accordance with the present invention, a display in the visible spectrum is produced where a scene is cyclically swept across an array of light elements to produce a set of time-amplitude-varying signals proportional to the light character of the scene. Charge transfer devices such as, for example, charge coupled devices or bucket brigade devices are connected to receive and store time spaced analog samples from one of said elements of said array. Charge packets are then read out of the devices and converted to a video stream for production on a video display.

In a more specific aspect, two sets of serial-parallel-serial charge coupled devices store alternate line-interlaced images of a scene and the stored images are then alternately read out in a single channel video stream.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

Figure 1:
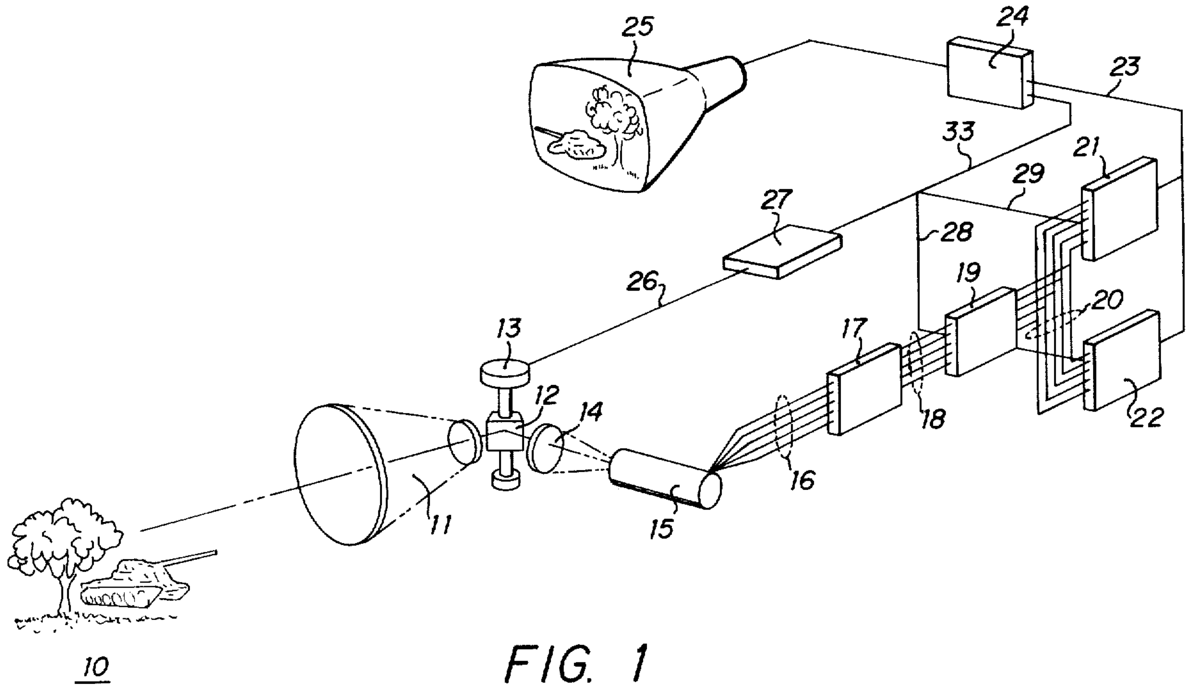
FIG. 1 is a block diagram of a system embodying the present invention.

In FIG. 1, an embodiment of the invention is shown in an infrared system wherein infrared radiation from objects in a scene 10 is projected by a telescope 11 of the afocal type onto a mirror 12. The mirror 12 is driven by a motor 13 under suitable control. The image of scene 10, as projected onto mirror 12, is passed through a lens 14 onto a columnar detector assembly mounted in a detector unit 15. The detector assembly is then connected by way of output channels 16 to a preamplifier unit 17 and thence by way of channels 18 to a postamplifier bank 19. The outputs of amplifiers 19 are connected by way of channels 20 to a pair of storage fields 21 and 22. The outputs from fields 21 and 22 form a single channel video stream on line 23. A single channel video processor 24 receives the signal stream and applies it to a multipurpose cathode ray tube display 25, such as, for example, the standard commercial TV tube described hereinafter in greater detail. A tachometer connected with motor 13 supplies suitable synchronizing signals (waveform A, FIG. 3) by way of channel 26 to control circuit 27. Leads from serial read four $\phi$ clock generator 40, serial write four $\phi$ clock generator 41, output terminal A of parallel read/-write clock select 34, and chip select field select enables switches 37 coupled to field A, CCD storage 21 of FIG. 2, constitute channel or bus 29 (FIG. 1); and leads from serial read four $\phi$ clock generator 40, serial write four $\phi$ clock generator 41, output terminal B of parallel read/write clock select 34, and chip select field select enable switches 37 coupled to field B, CCD storage 22 of FIG. 2, constitute channel or bus 28 (FIG. 1). These leads connect the control circuitry outputs (FIG. 3) to field A, CCD storage 21 and field B, CCD storage 22 to control operations of fields 21 and 22 in synchronism with the rotation of the scan mirror 12.

In the system shown in FIG. 1, infrared radiation from the scene 10 is detected by detector assembly 15 during a first sweep of the scene by mirror 12 across the face of the detector assembly 15. The detector assembly 15 converts the scene 10 into a plurality of parallel time varying electrical signals and stores them in field 21. During a second sweep of mirror 12, the signals are stored in field 22 while the image of the scene stored in field 21 is read out onto line 23 and thence utilized to produce display 25.

The invention is particularly directed to the provision of a system wherein the electrical signals appearing on channels 16 are maintained in electrical form until applied to the dispaly device 25 and are not converted back to visible light as in prior systems. The invention preferably involves the use of storage fields 21 and 22 in the form of serial input, parallel shift, serial output, charge coupled devices. The invention further relates to the operation of such devices in conjunction with an infrared scanning system to provide a suitable display.

Preferably, the detector assembly 15 will comprise a columnar array of photosensitive devices to produce a great multiplicity of signals and thus feed a like number of channels 16. For compatibility with 525 line commercial television electronics, about 482 lines are active. In such case, the detector assembly 15 would have half that many elements. Means will be provided, as will be described, to provide line interlaced outputs for storage in fields 21 and 22, thereby to provide a high resolution display on unit 25.

Figure 2:
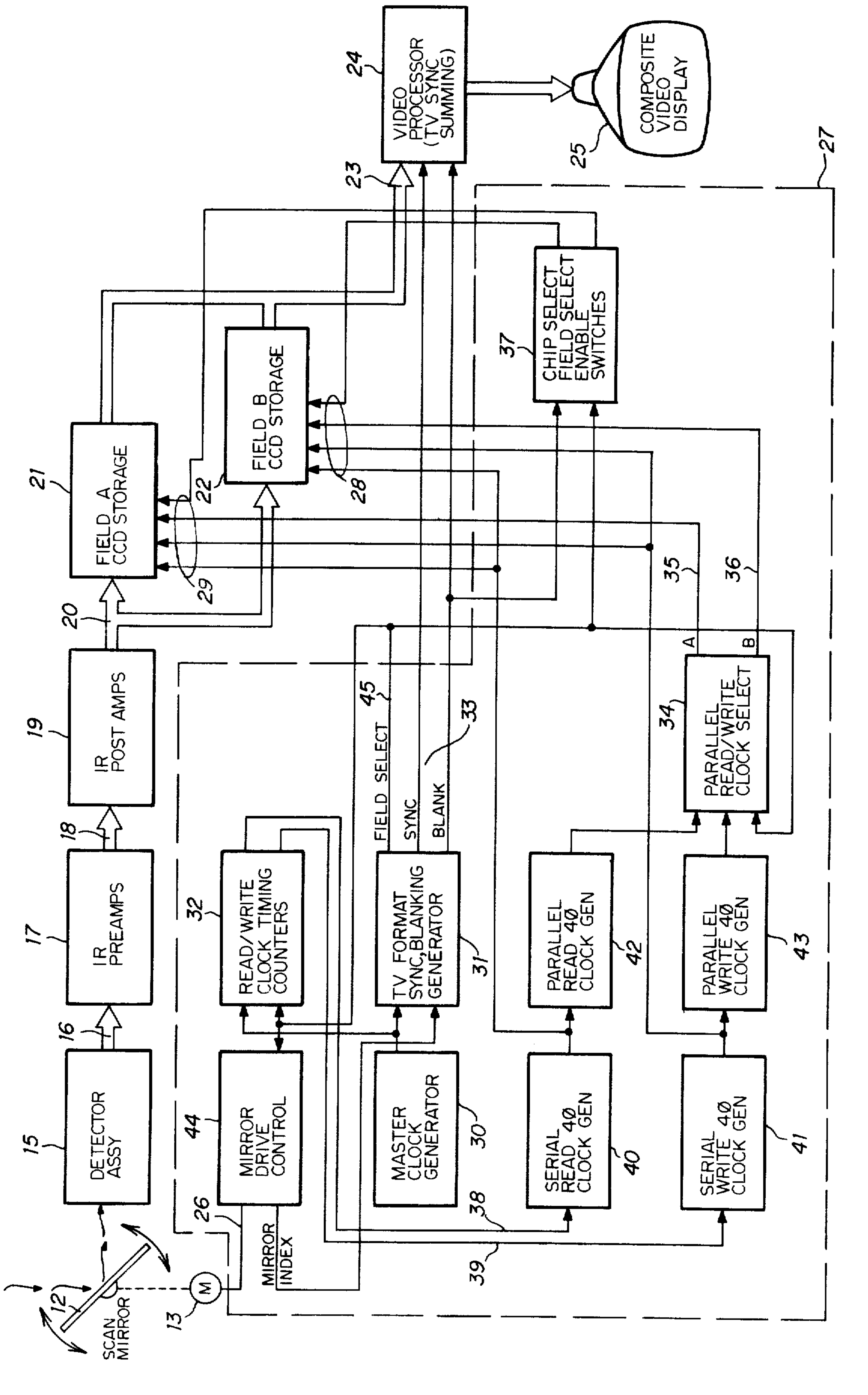
FIG. 2 illustrates the portions of the system of FIG. 1 in greater detail.

In FIG. 2, an embodiment of FIG. 1 is shown in block diagram form with mirror 12 being driven by motor 13 to project scene 10 onto the detector assembly 15 and to sweep the scene thereacross. The I.R. preamplifiers 17 and postamplifiers 19 are connected by multichannels 20 to field 21 and field 22 which preferably are charge coupled devices. The outputs of fields 21 and 22 are then connected by channel 23 to the video processor 24 and thence to the display unit 25. Motor 13 rotates mirror 12 during one-half of a cycle in a first direction and then reverses rotation during a mirror flyback half-cycle. In FIG. 2, the control circuit is shown within the dashed line 27.

Figure 3:
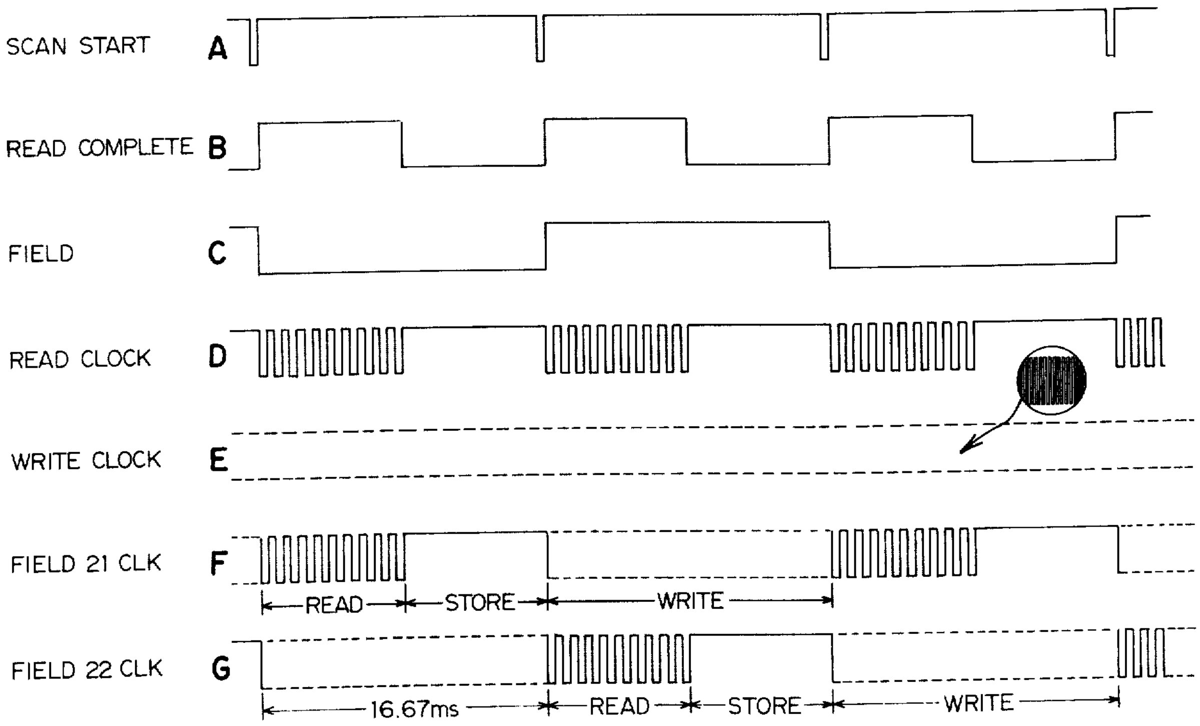
FIG. 3 is a timing diagram.

As shown in FIG. 3, a scan start pulse is generated by the mirror drive control 44 at the beginning of each scan cycle, as indicated by waveform A which goes to TV format sync, blanking generator 31 and master clock control generator 30.

Timing pulses of waveform B are generated by the master clock generator 30 to be true during the scan half-cycle and to be false during the mirror flyback half-cycle.

A field select waveform C which is an output signal of field select generator 31 serves to direct signals from amplifiers 19 through field select enabling switches 37 to field 21 during a first, third and subsequent odd numbered scan cycle and to field 22 during second, fourth and successive even numbered scan cycles.

A read clock control signal of waveform D generated by read/write clock timing counters 32 is provided to sample the analog signal from each of the light sensitive elements of the detector assembly 15 as a function of time. In one embodiment, there were 900 samples of each of the signals stored for each line in field 21 and 900 samples of each of the signals stored for each line in field 22.

Waveform E generated by the read/write clock timing counters 32 illustrates a high frequency write clock pulse signal employed to shift the data through the CCD devices of one field while the data is being read into the other field. More particularly as shown by waveform F and G, data is clocked into the field 21 by the waveform D. It is written out of the field 21 at a high rate by pulses of the E clock waveform. Waveforms D and E control the outputs of serial read and write clock generators 40 and 41, parallel and write generators 42 and 43, and the parallel read/write clocks select 34. Waveform G illustrates read pulses for field 22 while signals are being read into field 21, in an interval of the order of the scan data period.

In the embodiment of the invention here disclosed, the mirror cycle was 16.67 milliseconds in time length.

The truth tables for the field 21 clock of waveform F and the field 22 clock of waveform G, FIG. 3, are as follows:

Field 21 clock = read clock $\times \overline{\text{field}}$ + write clock $\times$ field;

Field 22 clock = read clock $\times \overline{\text{field}}$ + write clock $\times$ field.

In the example thus illustrated, where display 25 of conventional form has 482 lines active, the detector assembly 15 comprises a columnar array of 241 light sensitive elements. A suitable detector assembly may be of the type disclosed in U.S. Pat. No. 3,715,497. Cable 16 has 241 channels with a like number of preamplifiers 17, and a like number of channels 18, a like number of postamplifiers 19 and a like number of channels 20. Field 21 comprises 241 CCD units, each storing 900 charge packets. Similarly, field 22 comprises 241 CCD units, each storing 900 charge packets.

For the timing illustrated in FIG. 3, the read clock of waveform D is at a frequency of 100 kilohertz. The write clock of waveform E is at 17.3 megahertz.

For this purpose, the master clock generator 30, FIG. 2, is connected to a TV format sync, blanking generator 31 and to a read/write clock timing counter unit 32. The unit 31 is connected by way of line 45 to the mirror drive control 44 to synchronize the movement of mirror 12 (waveform A) with a field selector signal (waveform C) from unit 31. To a parallel read/write clock select unit 34 and to the chip select field select enables switches 37. The outputs A and B (waveforms D and E) of unit 34 are connected by way of lines 35 and 36 to fields 21 and 22, respectively. The waveforms D and E outputs of the counters 32 are connected, respectively, by way of lines 38 and 39 to a serial read four phase clock generator 40 and a serial write four phase clock generator 41. The output (waveform D) of generator 40 is connected to a parallel read four phase clock generator 42. The output of generator 41 (waveform E) is connected to a parallel write four phase generator 43. The outputs of generators 40 and 41, which are waveforms D and E, respectively, are also connected to field 21 and field 22 units through leads of channels 29 and 28, respectively. Generators 42 and 43 are connected to the parallel read/write clock select unit 34.

Figure 4:
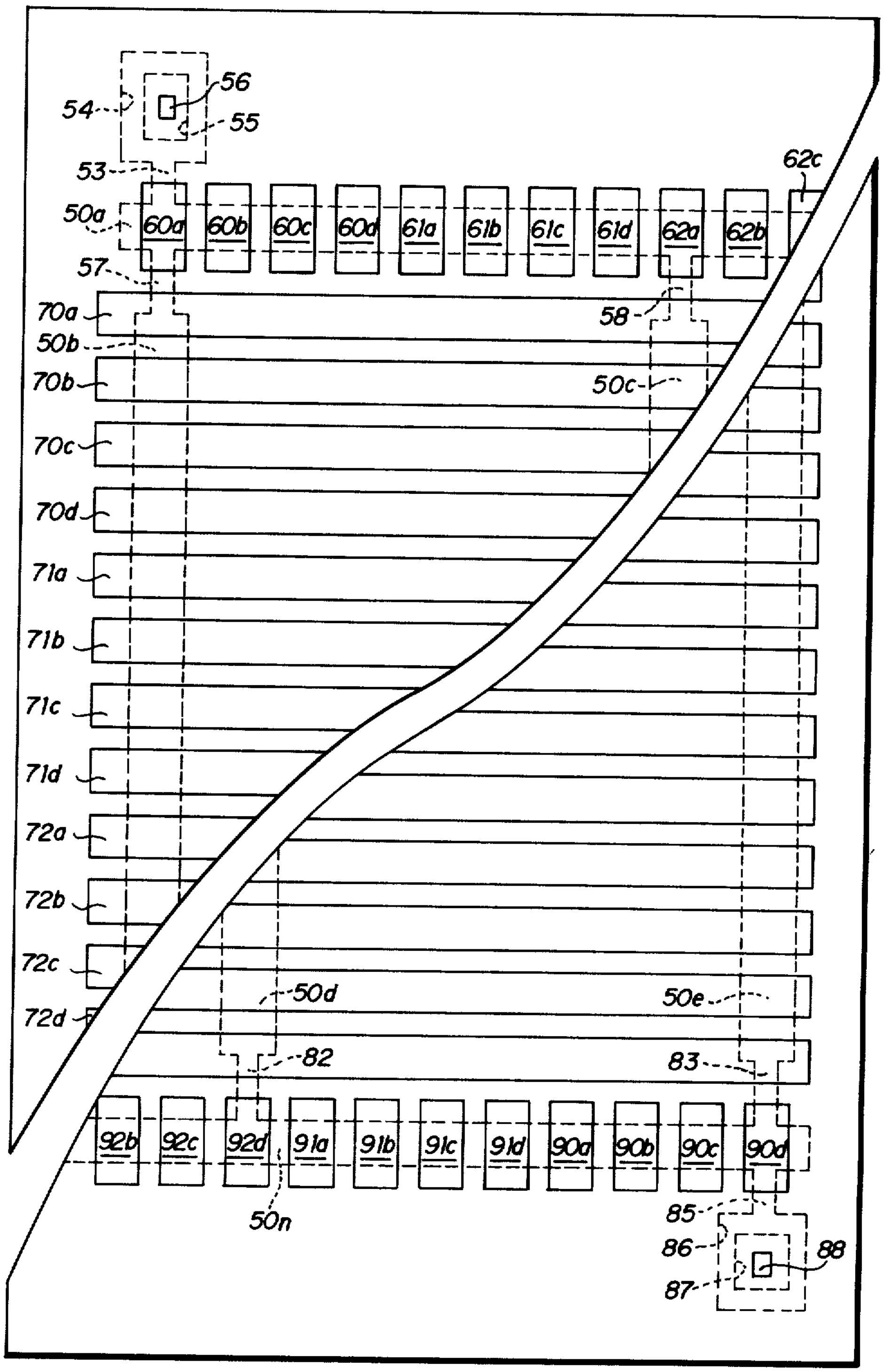
FIG. 4 illustrates one form of serial-parallel-serial charge coupled devices used in the present invention.

In FIG. 4, a storage unit for storing the output of one photodetector from assembly 15 for one line is illustrated diagrammatically. In this system, a semiconductor body is provided with a channel stop diffusion to form channels through which charge packets flow. The boundary of the channel stop diffusion is indicated in dotted lines in FIG. 4. The channel stop diffusion provides a top horizontal channel **50*a* and a plurality of vertically extending channels, such as channels 50*b*, 50*c* and a bottom channel 50*n*. The channel 50*a* is connected by way of an inlet 53 leading to a bay 54 in which a diode diffusion 55 is formed with a contact 56 being provided for the diode. The channel 50*a* is connected by way of an outlet 57 to the channel 50*b*. It is also connected by way of channel 58 to a channel 50*c* which extends parallel to channel 50*b*. A plurality of sets of phase electrodes 60*a*–60*d*, 61*a*–61*d*, 62*a*–62*d* are provided. They are in groups of four and extend above and across channel 50*a* to provide a four-phase CCD serial shift register structure. As above indicated, the storage element of FIG. 4 will serve to store 900 variable amplitude samples or charge packets of the signal from one detector in the columnar array of assembly 15. In such case, there will be 60 sets of electrodes spaced along the channel 50*a*. Set 60*a*–60*d*** serves as an active set inasmuch as it has an input channel 53 and an output channel 57. A second set, electrodes 61*a*–61*d*, serves as an isolation set. The set 62*a*–62*d* serves as an active set with an output channel 58. There are thirty vertical channels, such as channels 50*b* and 50*c*, connected to channel 50*a* as indicated in FIG. 4.

Sixty sets of parallel shift electrodes are provided. The first set comprises set 70*a*–70*d*. The second set comprises electrodes 71*a*–71*d*. A third set comprises electrodes 72*a*–72*d*.

At the bottom, the last two vertical channels 50*d* and 50*e* are connected by way of inlets 82 and 83, respectively, to a bottom channel 50*n*. The output end of channel 50*n* is connected by way of outlet 85 to a bay 86 in which there is formed a diode diffusion 87 with an outlet terminal contact 88. Phase electrodes associated with the serial channel 50*n* are electrode sets 90*a*–90*d*, 91*a*–91*d* and 92*a*–92*d* and extend across channel 50*n*.

In operation, as the mirror 12, FIG. 1, sweeps the scene across the detector array 15, the output of one of the elements of the detector array 15 is applied through diode 55 to the CCD serial channel 50*a*. Each successive charge packet is shifted down channel 50*a* by application of four phase pulses successively under electrodes 60*a*, 60*b*, 60*c* and 60*d*. Each packet is then shifted beneath the set of electrodes 60*a*–60*d*. As a charge packet is shifted under electrode 61*a*, the new sample of the output of the given sensor array element is shifted under electrode 60*a*. Thus, there will be collected in channel 50*a* the first thirty samples of the output from the sensor element.

Before the thrity-first sample is shifted under electrode 60*a*, all of the samples stored in channel 50*a* are shifted down into channels 50*b*, 50*c*, etc. by application of four phase pulses to the electrodes 70*a*–70*d*, etc. Thus, all of the first 30 samples are shifted in parallel by operation of the parallel bars 70*a*, etc. The 900th sample of the output of the sensor element may then be stored in the form of the last charge packet introduced into the channel 50*a* and transferred to the vertical shift registers 50*b*, 50*c*, etc.

For a 482 line video display line interlaced, 241 serial-parallel-serial CCD devices of the type shown in FIG. 4 form field 21. For field 22, FIG. 1, there will be provided a similar set of 241 serial-parallel-serial CCD units.

As the second cycle of the mirror sweeps the scene 10 across the detector assembly 15 for storage in field 22, the 241 packets in field 21 will be read out as a serial stream on channel 23 and will then be processed in conventional manner for producing the display on tube 25.

As indicated in FIG. 3, the write clock pulses of waveform E are of very high frequency compared with the read clock pulses of waveform D. The signals from assembly 15 are read into the devices, such as in FIG. 4, at the rate of the pulses of the read clock waveform D, FIG. 3. They are written out at the very high rate of the write clock waveform E, FIG. 3. Thus, significant time compression is achieved by reason of the use of the higher clock rate for reading the variable amplitude signals out of fields 21 and 22.

Figure 5:
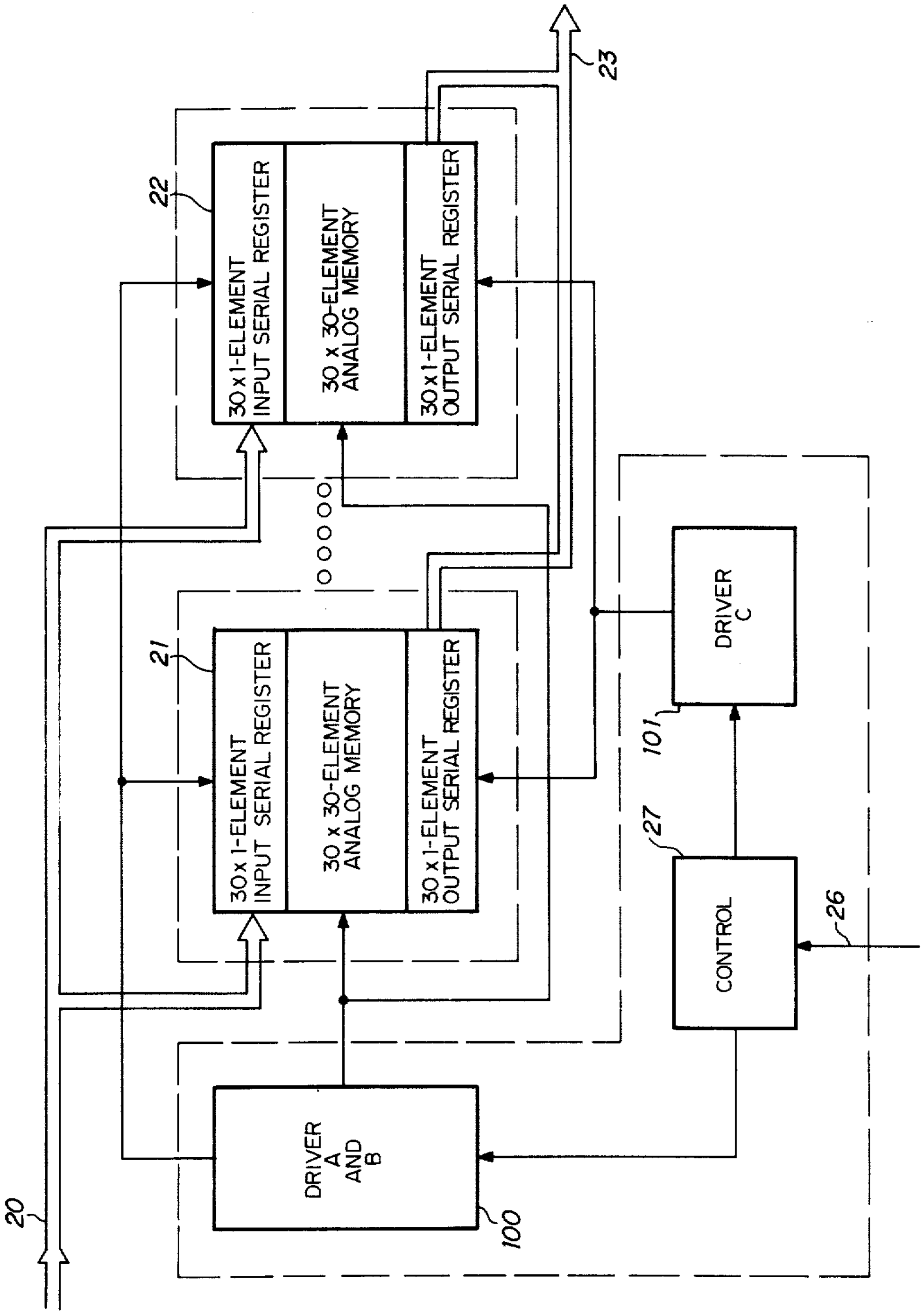
FIG. 5 illustrates the relation between two sets of devices of FIG. 4.

FIG. 5 illustrates control relationships in the system of FIGS. 1 and 2. Fields 21 and 22 each comprise a plurality of 30 × 1 element input serial registers with 30 × 30 element analog memories with a 30 × 1 element output serial register. Driver unit 100 is responsive to the circuit 27 (FIGS. 1, 2, and 5) alternately to load and unload the 30-by-30 element analog memories of field 21 and field 22. A driver unit 101 is connected to the 30-by-1 element output serial registers for unloading the fields 21 and 22 alternately.

The system thus far described will employ infrared energy reflected off the scan mirror 12 to the multielement detector array 15. The detector outputs are amplified by multichannel low noise preamplifiers and postamplifiers. The resulting video is sampled and stored in the CCD field storage fields 21 and 22 during active scan mirror times. During mirror retrace, one entire field of TV compatible video is stored in field 21 or field 22. Hence, storage is maintained during the mirror retrace cycle and the analog memory bank writes onto the display cathode ray tube 25 during the next active scan mirror time. Readout commences line by line address sequentially until a field has been written onto the display.

All clocking and mirror scanning is controlled from the master crystal oscillator 30, FIG. 2. Oscillator 30 is used also to clock the composite vertical and horizontal TV sync and blanking outputs of generator 31 coupled through channel 33 to the video processor 24. The composite sync and blanking is line by line summed in the video processor with the video as it is read out of the CCD field storage bank. Gain and level control is accomplished in the output stage of the video processor 24 where the video is in single channel form.

The field select signal waveform C, FIG. 3, generated by the TV format sync blanking generator 31 controls the mirror interlace scan in addition to determining which field storage bank 21 or 22 is reading and which is writing. As previously stated, the master clock 30 also supplies the read/write timing counters 32 which control the four phase clock generators 40–43 for the serial and prallel sections of each CCD. There are separate four phase clock generators for the read cycle and the write cycle since these two functions occur at different frequencies. That is, all CCDs are loaded in parallel in a total time of 8 milliseconds. The CCDs are read out sequentially in a total time of 16.67 milliseconds. A load cycle consists of 30 serial clocks for each parallel clock pulse. When 30 parallel clock pulses are counted, the entire 900 element CCD is loaded. At the beginning of the next mirror scan, the high frequency clocks are selected and the process is repeated for each CCD sequentially. The sequential time is controlled by the chip select, field select enable counters and switches in unit 37 which count TV lines and switch clocks to the proper CCDs for each line.

The synchronization signals serving to marry a scanner, such as shown in FIG. 1, with the scan converter are a field start signal and a frame start signal generated in the TV format sync, blanking generator 31. The frame start signal is to insure proper interlace while the field start signal is to start loading the CCDs to within one-fourth the resolution element of the mirror scan angle for each field.

The serial-parallel-serial CCD devices are the basic building blocks of a parallel-to-serial conversion process which may be appropriately identified as time interval compression address sequentially (TICAS). The function of each CCD is to store one line of information from its video channel. With the completion of one scan cycle, one complete infrared field is stored in one of the fields 21 or 22. During the next scan cycle, another complete field is stored in the other of the devices 21 and 22. During the same interval of time, each channel of the first group of the device is addressed sequentially so that only one channel of video information is read out at a time. The time interval during which any particular field is read out is considerably shorter than the time interval during which the information is being stored. Thus, there is achieved a time interval compression.

The scan mirror 12 may be appropriately driven in a single direction by a motor with a fast spring return and operate at a rate of 60 Hz in performing horizontal scanning. The detectors in the array 15 are located on a line and therefore require interlacing to construct a complete frame. A fast response solenoid may be used to slightly tilt the scan mirror prior to alternate scans to provide for a 2:1 interlace. Such interlace scanning action may be of the type described in U.S. Pat. No. 3,742,238.

With a one direction scan and since minimization of power is of primary concern, the duty cycle of the scanner may be preferably of the order of 55%. The major impact of this reduction is that the object space aspect ratio (horizontal/vertical) may be 4:3 yielding a nominal field of view of 7.5° × 10°. Of course, other system performance parameters and operations may remain the same as disclosed in U.S. Pat. No. 3,742,238. In that system, cryogenic cooling for a HgCdTe detector array is provided by expanding nitrogen gas through a cryostat.

While a specific example has been described above as involving approximately 240 detectors, it will be apparent that different specific output systems may be accommodated. Examples of a system which could utilize standard television displays are:

A. 525 line TV display: An interlaced detector array above-described consists of approximately 240 detectors, having scanner aspect ratio of 3:4 and operates yielding a standard 480 line picture height with standard picture width.

B. 525 line TV display: An interlaced detector array consisting of approximately 160 detectors, having a scanner aspect ratio of approximately 1:2 and operating essentially the same as the system described herein, yield a 320 line picture height and a standard picture width of 640 elements.

C. 875 line TV display: A contiguous detector array consisting of approximately 400 detectors, having a scanner aspect ratio of aproximately 3:4 and operating essentially the same as the system described herein except that the scan mirror would index only one-half an IR resolution element between fields, yielding a 400 IR line picture height with a standard 800 TV line picture height and an IR picture width of 533 elements with standard TV width.

D. 875 line TV display: An interlaced detector array consisting of approximately 270 detectors, having a scanner aspect ratio of approximately 1:2 and operating essentially the same as the system described herein, yielding a 540 line picture height and a standard picture width of 1080 elements.

E. 875 line TV display: A contiguous detector array consisting of approximately 270 detectors, having a scanner aspect ratio of approximately 1:2 and operating essentially the same as the system described herein except that the scan mirror would index only one-half an IR resolution element between fields, yielding a 270 IR line picture height with a standard 800 TV line picture height and an IR picture width of 533 elements with standard TV width.

Input coupling to the CCD devices such as shown in FIG. 4 may be in accordance with known techniques and structures such as, for example, described and claimed in application Ser. No. 398,285, filed Sept. 17, 1973, entitled CHARGE COUPLED DEVICE MULTIPLEXER and assigned to the assignee of the present application.

While in FIG. 4 such active electrodes such as set 60*a*–60*d* are separated by isolation electrodes 61*a*–61*d* from electrodes 62*a*–62*d*, it will be understood that the isolation electrodes may in some cases be eliminated. However, they are preferred inasmuch as they greatly minimize degradation of the charge packets being shifted through a given register. It will futher be understood that the signals produced by operations herein may be employed for purposes other than production of a display on tube 25 or any counterpart thereof. The signals may be utilized for analysis and control purposes where the characteristics of a serial video stream of variable amplitude pulses provides the input data.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an analog data system, the combination which comprises:

a. a signal sampling generating means to generate a set of time spaced samples of each of a plurality of concurrent time-amplitude-variable signals during each of a plurality of successive data periods where said samples are taken at uniform time spaced intervals, b. two sets of CCD storage means coupled to the signal sampling generating means to alternately store a set of variable amplitude charge packets derived from said samples of said signals, and c. means alternately to transfer from said CCD storage means as a single data stream for display all the samples of all signals in said storage means in an interval of the order of said data period.

2. The combination set forth in claim 1 wherein each set of said CCD storage means comprises a plurality of charge coupled devices with a slow clock operating to input and shift charge packets into said devices in parallel and a high speed clock operating serially to write said packets out of said devices.

3. The combination set forth in claim 1 wherein each said set of CCD storage means comprises a plurality of parallel connected charge coupled devices with one of said signals applied to each of said devices and wherein a common output channel has gated connections leading to all said devices.

4. The combination set forth in claim 1 wherein each said set of CCD storage means comprises a plurality of serial-parallel-serial charge coupled devices.

5. The combination set forth in claim 1 wherein each said set of CCD storage means comprises serial-parallel-serial connected charge coupled devices with control means to read first, third and successive odd numbered sets of said signals into one set of said devices and to read the second, fourth, and successive even numbered sets of said signals into the other set and wherein a common output channel has gated connections leading to both said sets for alternate transmission therefrom.

6. In an infrared scanning system, the combination which comprises:

a. a columnar array of infrared sensors,
b. means cyclically to sweep a scene across said array in successive frame intervals to produce repetitive sets of time-amplitude-variable signals representative of optical variations across said scene,
c. a pair of storage means coupled to the output of the columnar array of infrared sensors to alternately store successive sets of variable amplitude charge packets derived from said signals at uniform spaced sample intervals, and
d. means coupled to the pair of storage means for alternately transferring out from storage as single data streams for display samples of signals in one said storage means in the frame interval, during which the succeeding set of signals is being stored in the other said storage means.

7. In an infrared visual display system, the combination which comprises:

a. a columnar array of infrared sensors,
b. means to sweep a scene across said array to produce repetitive sets of time amplitude variable signals representative of optical variations along alternate slices across said scene,
c. means to store as a first sample set uniform spaced time samples of each of said signals,
d. means to sweep said scene across said array shifted by an amount one-half the space between centers of said slices, and
e. means to store as a second sample set the outputs of said sensors while transmitting from storage to a video channel said first sample sets serially and one slice at a time.

8. In a system wherein a scene is cyclically swept across a column of light sensitive elements to produce a set of time-amplitude-varying signals proportional to the light character of said scene, the improvement which comprises:

a. a first set of charge coupled devices each connected to receive and store time spaced samples of one element of said column whereby at the end of each scan, a complete sample-image of said scene is stored in said first set,
b. a second set of charge coupled devices each connected to receive and store time spaced samples of said array line interlaced with those of said first set, and
c. means operable during successive scan cycles to write alternately from said sets to an output channel to produce an interlaced string of variable amplitude signals representative of said scene for display.

9. The method of processing repetitive sets of a plurality of concurrent time-amplitude-variable signals which comprises:

a. converting each of said signals in each said set into a train of discrete charge packet samples at selected sample intervals during a data frame interval,
b. storing a first set of said charge packets as a plurality of packet trains, one train for each of said signals,
c. storing a second set of said charge packets as a plurality of packet trains, one train for each of said signals, and
d. alternately transferring said first and second sets of stored trains as one serial stream from storage in a time interval of the order of said data frame interval.

10. The method of claim 9 in which said charge packets are stored and shifted serially in and through semiconductor charge coupled devices.

11. The method of claim 9 in which said charge packets for each said signal are shifted serially, then in parallel and then serially through the semiconductor charge coupled devices.

12. A method of infrared scanning a scene which is cyclically swept across an array of light sensitive elements to produce a set of time-amplitude-varying signals proportional to the light character of said scene, which comprises:

a. during a first scan concurrently receiving and storing time spaced charge packets derived from all elements of said array whereby at the end of said first scan, a complete sample-image of said scene is stored,
b. during a second scan concurrently receiving and storing time spaced charge packets derived from all elements of said array but line interlaced with those of said first scan whereby at the end of said second scan a second complete sample-image is stored,
c. during each scan writing as a single stream the charge packets stored during the preceding scan, and
d. converting each said stream to a visible reconstruction of said scene.

13. An infrared imager system comprising in combination:

a. scanning infrared detector means for producing a set of electrical signals corresponding to incident radiation at a plurality of parallel output channels during each scan cycle;
b. a plurality of arrays of semiconductor charge coupled devices connected to said detector means for receiving said electrical signals in parallel at a first clock rate;
c. means coupled to said arrays of semiconductor charge coupled devices to enable said arrays sequentially at a first clock rate for storage of successive sets of said signals in different arrays;
d. means coupled to the outputs of said arrays of semiconductor charge coupled devices for providing a serial read-out of data from one said array of charge transfer devices at a second clock rate of one set of said signals concurrently with storage of a later set in another of said arrays; and
e. display means coupled to said arrays of charge transfer devices for receiving and displaying said serial data from said arrays at said second clock rate.

14. An infrared imager system as set forth in claim 13 wherein each channel of said detector means is coupled to said array of charge transfer devices through amplifying means.

15. An infrared imager system comprising in combination:

a. an array of infrared detectors adapted to scan a scene;

b. a plurality of semiconductor charge transfer device arrays for receiving parallel data from said detector array at a first frequency and providing serial output data at a preselected second frequency;

c. means coupled to said plurality of semiconductor charge transfer device arrays for controlling storing the outputs of said detector array in successive scans of said scene in different ones of said semiconductor charge transfer arrays; and d. means coupled to the outputs of said plurality of semiconductor charge transfer device array to apply the content of said arrays to a display device as a serial stream.

16. In an analog data system, the combination which comprises:

a. means for generating a set of time spaced samples of each of a plurality of concurrent time-amplitude-varying signals during each of a plurality of successive data periods where said samples are taken at uniform time spaced intervals;

b. two sets of storage field means coupled to the means for generating a set of time spaced samples of each of a plurality of concurrent time-amplitude-varying signals for alternately storing successive sets of variable amplitude charge packets derived from said samples of said signals; and c. means coupled to the two sets of storage field means for alternately transferring from said two sets of storage field means as a single data stream the samples of signals in said two sets of storage field means in an interval of the order of said data period.

17. The combination as set forth in claim 16, wherein the two sets of storage field means comprise charge transfer devices.

18. The combination as set forth in claim 17, wherein the charge transfer devices are charge coupled devices.

19. The combination as set forth in claim 18, wherein the charge transfer device are bucket brigade devices.

* * * * *